Feb. 23, 1960     B. F. FELLERMAN     2,926,305
ELECTRICAL INDICATORS
Filed March 2, 1956
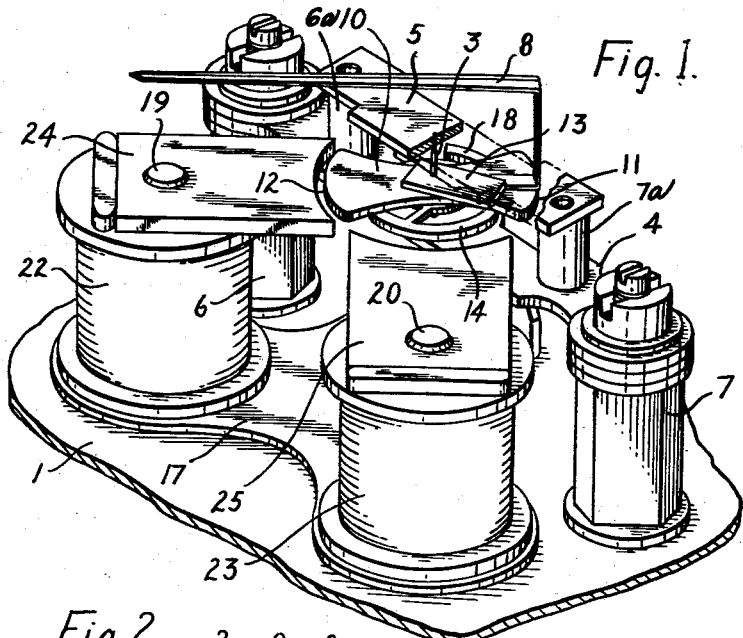
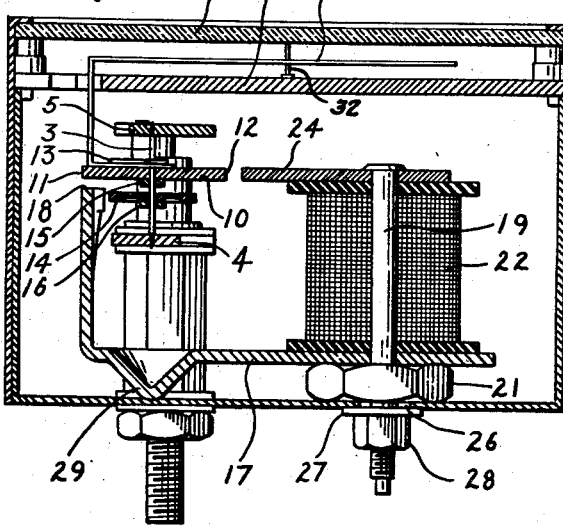
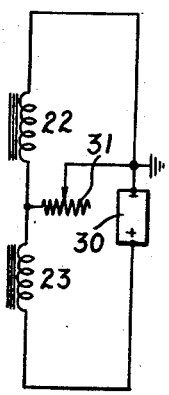
B. F. FELLERMAN
Inventor
By Moore & Hall
Attorneys

United States Patent Office 2,926,305
Patented Feb. 23, 1960

2,926,305

ELECTRICAL INDICATORS

Bernard Frederick Fellerman, London, England, assignor to Smiths America Corp., Washington, D.C.

Application March 2, 1956, Serial No. 569,010

Claims priority, application Great Britain March 3, 1955

13 Claims. (Cl. 324—147)

The present invention relates to electrical indicators of the type in which a ferromagnetic member, which may or may not be permanently magnetised, moves in a magnetic field. Such indicators will be referred to as "of the moving iron type." Such indicators are frequently used in systems to provide a remote indication of a quantity, such as for example the quantity of fuel in a container, and it is frequently necessary to provide for the adjustment or calibration of the indicator so that it gives, with reference to a previously-marked scale, an appropriate indication.

It is the object of the present invention to provide an electrical indicator of the moving iron type wherein calibration is facilitated.

According to the present invention, in an electrical indicator of the moving iron type having a ferromagnetic member mounted upon a spindle for rotation in a plane about an axis, we provide two magnetically soft pole pieces co-operating with said ferromagnetic member and rigidly located with respect to each other, disposed substantially in said plane and adjustable to a limited extent in any direction in said plane relative to the ferromagnetic member, and electric windings associated with said pole piece members adapted to be energised with electric currents in accordance with a variable to be indicated.

The position of the pole pieces is adjusted to give the required calibration, and thereafter the pole pieces are locked in position.

Preferably the pole pieces are rigidly attached to a soft iron member. They may both be disposed to co-operate with a pole of the ferromagnetic member, and the soft iron member is conveniently shaped and disposed to provide at least part of a flux return path from another pole of the ferromagnetic member to the pole pieces.

An indicator in accordance with the invention and suitable for use, for example, in a fuel contents gauge for a motor vehicle will now be described with reference to the accompanying drawings of which—

Figure 1 is a perspective view of the indicator.

Figure 2 is a sectional view of the indicator taken on a plane containing the axis of spindle 3 and solenoid 24.

Figure 3 is a diagram of an electric circuit in which the indicator may be used.

The indicator is contained in a generally rectangular mild steel case 1 having a glass front 2, and is intended to be mounted with the glass front approximately vertical. A spindle 3 is mounted in bearings between strips 4, 5 which are spaced apart by posts 6a, 7a and attached to the back of the case by two pillars 6, 7. Spindle 3 carries a pointer 8 moving over a scale 9 also attached to the case. Stops 32 are provided to limit the movement of the pointer to about a third of a circle. The spindle 3 carries, behind the scale, an armature 10 of magnetically-soft material having two poles 11, 12, and with its longitudinal axis at right angles to the spindle 3. A brass weight 13 is carried by the armature 10. A brass wheel 14 is loosely mounted on the spindle 3 between two washers 15, 16 which are situated behind the armature 10 and are solidly attached to the spindle 3. Situated on the inside of the back of the case is a soft-iron plate 17, generally triangular in form, but with an outward extension at right angles at one vortex to form a pole piece 18 which lies immediately behind the locus of one of the poles, 11, of armature 10. The spindle axis passes through the plate 17 near this vertex. The plate carries, one adjacent each of the remaining vertices, two screws 19, 20 of soft magnetic material, each extending parallel to the spindle 3, and retained in position on the plate 17 by lock nuts 21. The portions of the screws extending towards the scale carry solenoid windings 22, 23, and flat pole pieces 24, 25 which lie in the plane of the armature 10 and adjacent to the locus of its second pole 12. The opposite ends of the screws 19, 20 extend through holes 26 in the back of the case, which are sufficiently large to permit appreciable movement of the plate 17, and the plate is retained in a desired position by spring washers 27 and nuts 28 outside the case on the ends of screws 19, 20. The lock nuts 21 mentioned earlier lie between plate 17 and the back of the case, and a projection 29 is formed on the plate of a depth corresponding to that of the lock nuts to ensure that it lies substantially parallel to the back of the case. Washers of insulating material are provided to insulate the pillars 6, 7, from the case and from the strips 4, 5, to enable them to be used as terminals for the solenoid windings.

Wheel 14 serves to damp oscillation of spindle 3, armature 10 etc. by friction. The indicator has a magnetic circuit with two branches, corresponding to the limits of movement of the pointer 8 and armature 10 imposed by the previously mentioned stops. The first is: the screw 19 forming the core of solenoid 22, the pole piece 24, the armature pole 12, the armature pole 11, the pole piece 18, the plate 17 and the screw 19; the second is: the screw 20 forming the core of solenoid 23, the pole piece 25, the armature pole 12, the armature pole 11, the pole piece 18, the plate 17 and the screw 19. The function of the weight 13 is to exert a gravitational force tending, within the permitted movement of the armature 10, to rotate it into line with pole piece 24 of solenoid 22.

The two solenoid windings 22, 23 are connected in series in such a sense that when they are connected across a suitable D.C. source the two pole pieces 24, 25 are of like polarity. The free terminal of solenoid 23, which has the smaller number of turns, is connected to the positive terminal of a D.C. source 30 (conveniently provided by the usual vehicle battery), and the free terminal of solenoid 22 to the earthed negative terminal. The junction of the two windings is connected to one terminal of a variable resistor 31, the slider of which is earthed, and is positioned in accordance with the level of liquid fuel in a tank through a conventional float and linkage mechanism. When the resistor 31 has its maximum value (tank empty) the armature 10 tends to line up with pole piece 24 and solenoid 22 which has the greater number of turns. However, as resistance 31 is reduced the current through solenoid 23 increases, and that through solenoid 22 decreases, so that the armature 10 approaches a position of alignment with pole piece 25 against the gravitational force exerted by the weight 13. Thus as the level of fuel varies, the magnitude and ratio of the currents in the solenoids vary, and the position of the armature 10 and pointer 8 varies accordingly. By adjustment of the position of plate 17, and consequently also of the pole pieces 18, 24, 25, the relation between pointer deflection and fuel contents may be varied. The positioning of pole piece 18 behind the locus of armature pole 11 allows the plate 17 greater freedom of movement without danger of fouling the armature. When the indicator has been assembled the position of the plate 17 is adjusted to give the most satisfactory measure of agreement between fuel contents and scale reading. Thereafter the plate is locked in position.

It is to be understood that by the term "soft iron" we mean material which is magnetically soft, without any reference to its mechanical properties.

I claim:

1. An electrical indicator of the moving iron type, having a ferromagnetic member mounted upon a spindle for rotation in a plane about an axis, two magnetically-soft pole pieces co-operating with said ferromagnetic member and rigidly located with respect to each other, disposed substantially in said plane and jointly adjustable to a limited extent in any direction in said plane relative to the ferromagnetic member, and electric windings associated with said pole piece members adapted to be energised with electric currents in accordance with a variable to be indicated.

2. An indicator as claimed in claim 1 wherein the pole pieces are rigidly attached to a soft iron member.

3. An indicator as claimed in claim 2 wherein said ferromagnetic member has two poles and said pole pieces are both disposed to co-operate with one of said poles, the soft iron member being shaped and disposed to provide at least part of a flux return path from the other of said poles of the ferromagnetic member to the pole pieces.

4. An indicator as claimed in claim 3 wherein the soft iron member is generally planar and carries, at right angles thereto, two similar elongated soft iron core members, each of which carries a pole piece at the end away from the soft iron member, the electric windings associated with each pole piece surrounding the corresponding core, an elongated portion of the soft iron member being bent up so that its end lies adjacent one of said poles of the ferromagnetic member, to provide part of the flux return path.

5. An indicator as claimed in claim 2, having a housing, the axis about which the ferromagnetic member is rotatable being fixed in relation to the housing and at right angles to its base, the soft iron member being attached to the said base in such a manner as to be adjustable to a limited extent in directions parallel to the base.

6. An indicator as claimed in claim 5 wherein the spindle is mounted in relation to the housing by means of electrically-conducting support members which serve to establish electrical connections to the windings.

7. An indicator as claimed in claim 3 wherein the windings are connected in series in such a sense that upon the passage of an electric current therethrough the pole pieces become magnetised with like polarities.

8. An indicator as claimed in claim 3 wherein an inertial member is mounted loosely on the spindle for damping purposes.

9. An indicator as claimed in claim 5 wherein the ferromagnetic member is of soft iron.

10. An indicator as claimed in claim 5 wherein the ferromagnetic member is restrained towards a datum position about its axis.

11. An indicator as claimed in claim 10 adapted to be used with the spindle in a substantially horizontal position, the ferromagnetic member and spindle being rendered pendulous.

12. The combination set forth in claim 1, a movable sub-chassis carrying said two magnetically-soft pole pieces adapted to cooperate with said ferromagnetic member, said pole pieces being rigidly located and with respect to said sub-chassis, adjustable positioning means for said sub-chassis so arranged that said pole pieces are disposed substantially in said plane and are jointly adjustable to a limited extent in any direction in said plane relative to said ferromagnetic member.

13. An indicator as claimed in claim 12, wherein said sub-chassis is generally planar and carries, at right angles thereto, two similar elongated soft iron core members each of which carries one of said pole pieces at the end away from the sub-chassis, and comprising also a housing with a base portion, the said axis of rotation of the ferromagnetic member being fixed in relation to the housing and at right angles to the base portion, and the sub-chassis being attached to the base portion by the said adjustable positioning means in such a manner that it is adjustable to a limited extent in directions parallel to the base portion.

References Cited in the file of this patent

UNITED STATES PATENTS

| 1,551,704 | Shire | Sept. 1, 1925 |
| 2,040,060 | Middleton | May 5, 1936 |
| 2,486,972 | Osterlund | Nov. 1, 1949 |
| 2,507,801 | Middleton | May 16, 1950 |
| 2,741,743 | Kern | Apr. 10, 1956 |

FOREIGN PATENTS

| 4,453 | Great Britain | Sept. 18, 1883 |